Figure 1:
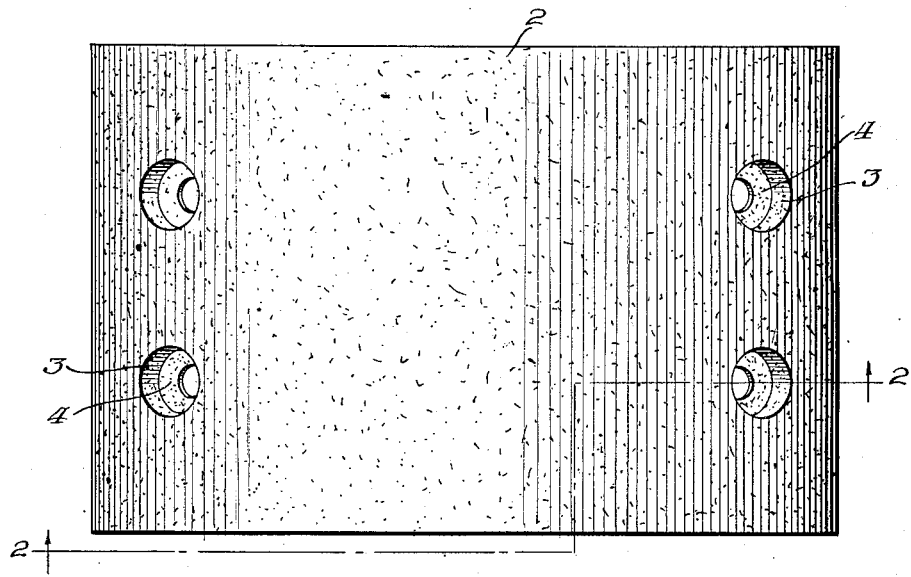

Dec. 20, 1932.  I. J. NOVAK  1,891,723

COMPOSITE FRICTION BLOCK

Filed May 17, 1930

Inventor:
Izador J. Novak
By Frank L. Belknap
Attorney

Patented Dec. 20, 1932

1,891,723

UNITED STATES PATENT OFFICE

IZADOR JACOB NOVAK, OF BRIDGEPORT, CONNECTICUT, ASSIGNOR TO RAYBESTOS-MANHATTAN, INC., OF BRIDGEPORT, CONNECTICUT, A CORPORATION OF NEW JERSEY

COMPOSITE FRICTION BLOCK

Application filed May 17, 1930. Serial No. 453,410.

This invention relates to an improved construction for molded friction elements, especially brake blocks whereby certain deficiencies of earlier types are eliminated.

It is known in the art to mold and thereafter harden in situ a mass of friction material, whether previously formed or not, into a backing member having means of attachment to a brake shoe. This backing member may be made of cast iron, bronze, pressed steel, or other metals, so formed as to hold the mass of friction material (usually asbestos and binder). It has previously been considered necessary to hold the friction mass in a metallic container because the standard compositions for such use are ordinarily unable to withstand the stresses produced by the interaction of the frictional torque on the friction surface and the bolts holding the block to the brake shoe. Certain materials are self-sustaining due to the binder strength, but it has been recently developed that more porous, weaker compositions have decided merits of frictional properties and durability which make their use extremely desirable. These compositions have generally been used in combination with metallic backings, and it is to an improved construction using these compositions that this invention relates.

One of the difficulties in the use of a metallic backed brake block is that in service a powerful shearing torque develops due to the difference between the frictional force at the brake shoe metal surface against the metal surface of the back of the block (the static surface) and the frictional force of the metal drum against the composition surface (the kinetic surface). From a mathematical examination of the two forces involved, it will be seen that the coefficient of friction of the two sets of surfaces are the determining factors. If both coefficients are the same, or the coefficient of friction is greater at the static surface, there is no shear on the mass of the block or its fastenings during engagements—merely radial pressure, whereas at the other extreme, that is, zero friction at the back of the block and the greatest difference in frictional coefficients, all the force developed at the surface of the block is expended tangentially against the holding means. It is for this reason that it has been necessary to provide such a strong holding means for blocks of this type. The very strong holding means was forced because of the considerable difference in relative static and working surface coefficients to absorb a larger proportion of the retarding force developed at the friction surface.

My invention comprises a composite brake block having substantially the same coefficient of friction on both the static and the working surfaces. The block comprises a relatively thick mass of friction material having a relatively lower density, strength and hardness than the backing layer which is relatively thin and perforated and serves to hold firmly the attaching means, such as bolts, as well as the friction material. Both layers comprise friction material having a fibrous base, the essential difference being that the thin reinforcing layer is made denser or otherwise stronger (as by the use of a strong binder) than the thick friction layer. The relative thickness of the layers is not, however, intended as a limitation, as for certain purposes, the thickness relation may be different as, for instance, when the block above described is worn down, or when thin blocks are to be made. Inasmuch as the composition of the two layers is similar, the frictional coefficients are also quite similar, and in a preferred construction where, except for density, the compositions are substantially the same, the static surface is even more securely held during use, as the static coefficient of friction of a given material is almost always higher than its kinetic coefficient of friction.

In one embodiment of this invention, I produce a sheet of asbestos board about 3/16" thick on a wet machine, dry it, saturate it with a cresol resin china wood oil mixture, and, after a suitable aging period, partially cure the binder so that, while dry, it is still relatively deformable. Its density is here about 1 oz. per cubic inch. I set aside one portion of the sheet for later use and pulverize and disintegrate the rest.

If, for instance, I am making a curved brake block for use in an external brake, I may take a section of the sheet cut to the exact size of the back of the brake block to be made, perforate it with a suitable number of holes, say, 3/4" in diameter, using a die which produces a hole larger on one side of the sheet than the other, lay the sheet in a suitable mold with the large end of the holes downward, pour in above this a quantity of the pulverized compound sufficient to produce a density of, say, 0.85 ozs. per cubic inch in the finished pressed state, and mold the combination to size and density.

I may, if desirable, apply, a cementing material such as a phenol resin varnish to the upper surface of the perforated sheet and around the perforations in order to secure better bonding of the pulverized compound to the backing sheet. The pulverized compound packs down very satisfactorily and fills the perforations in the sheet. The holding buttons thus formed are tightly fastened because of the manner in which the holes were cut and the compound applied. The composite molded block is then cured to harden the binder completely, and because of the similarity in composition between the reinforcing back and the mass of pressed fibre, the curing period and shrinkage during cure is substantially the same for both. Also, as the compositions are similar there is no material difference in coefficient of expansion during heating or cooling and the resultant composite structure is tightly held together at all temperatures, which is very much unlike the conditions obtained when such a composition is combined with a metallic backing. After cure, the block is machined to correct size and bolt holes drilled and countersunk so that the bolts rest on the backing composition.

Blocks made substantially as above have been tested under severe braking conditions in service, and in spite of severe use have shown no tendency to delaminate or break away from holding means, even where these are considerably weaker than those used with metallic backed brake blocks.

While I have described a particular method where the composition of reinforcing member and friction material are identical, I do not wish to limit myself to such a condition as I may, if desirable, without departing from the spirit of the invention, use different compositions which give the desired and described frictional and strengthening characteristics.

For instance, a cloth or tape back may be used, or a stronger binder may be used in the reinforcing backing, or a weaker binder, such as a drying oil or asphalt, may be used in friction mass, etc. Different shapes of backing member may also be included such as separated strips or the like. Friction elements of other shapes than curved blocks may also be made, utilizing the principles outlined above, as for instance, annular rings or sections of rings, blocks having wedge sections, flat friction strips, etc. I wish to include any composite structure which provides a reinforcing non-metallic backing having a frictional coefficient similar to or higher than the working friction surface.

In the drawing, Fig. 1 is a top plan view of a curved brake block made in accordance with the present invention.

Figure 2:
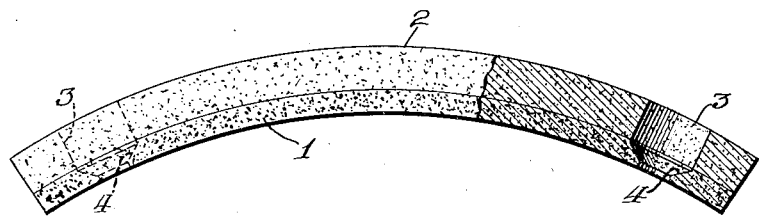

Fig. 2 is a cross sectional view taken on line 2—2 of Fig. 1.

Referring more in detail to the drawing, 1 represents the backing layer of relatively high density which may comprise asbestos and a suitable binder. 2 designates the wearing face layer which is of relatively low density and which may comprise bonded asbestos. As has been hereinbefore pointed out, the layer 1 is preferably thinner than the layer 2. The thin reinforcing layer is made denser or otherwise stronger (as by the use of a strong binder) than the thick friction layer. The wearing layer 2 is provided with bolt holes 3 which are drilled and countersunk so that the bolts rest on the shoulder 4 disposed in the back layer 1.

I claim as my invention:

1. In a friction mechanism, a composite block comprising a wearing face layer of relatively low density comprising unwoven asbestos and a reinforcing back layer of relatively higher density comprising bonded asbestos, the static frictional coefficient of the back being equal to or greater than the kinetic frictional coefficient of the face.

2. A composite brake block comprising a wearing face layer of bonded asbestos of relatively low density and a reinforcing non-metallic back of relatively higher density.

3. A composite brake block comprising a wearing face layer of bonded asbestos of relatively low density and a reinforcing back of relatively higher density, the composition of both layers being substantially similar.

4. A composite brake block comprising a wearing face of bonded asbestos of relatively low strength and hardness and a fibrous reinforcing back of relatively higher strength and hardness.

5. A composite brake block comprising a wearing face of bonded asbestos of relatively low strength and hardness and a fibrous reinforcing back of relatively higher strength and hardness, the latter being perforated to receive interlocking sections of the wearing compound.

6. A composite brake block comprising a wearing face of bonded asbestos of relatively low strength and hardness and a fibrous reinforcing back of bonded asbestos of relatively higher strength and hardness.

In testimony whereof I affix my signature.

IZADOR JACOB NOVAK.